United States Patent
Constantinides et al.

(10) Patent No.: US 11,055,252 B1
(45) Date of Patent: Jul. 6, 2021

(54) MODULAR HARDWARE ACCELERATION DEVICE

(71) Applicant: Amazon Technologies, Inc., Seattle, WA (US)

(72) Inventors: Kypros Constantinides, Seattle, WA (US); Darin Lee Frink, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 681 days.

(21) Appl. No.: 15/012,409

(22) Filed: Feb. 1, 2016

(51) Int. Cl.
*G06F 13/40* (2006.01)
*G06F 13/42* (2006.01)
*G06F 1/18* (2006.01)

(52) U.S. Cl.
CPC ...... *G06F 13/4068* (2013.01); *G06F 13/4282* (2013.01); *G06F 1/185* (2013.01); *G06F 13/4027* (2013.01)

(58) Field of Classification Search
CPC .......................... G06F 13/4068; G06F 13/4282
USPC ........................................................ 710/314
See application file for complete search history.

(56) References Cited

U.S. PATENT DOCUMENTS

| | | | | |
|---|---|---|---|---|
| 2007/0025095 A1* | 2/2007 | Beall | ...................... | G06F 1/187 361/796 |
| 2008/0080261 A1* | 4/2008 | Shaeffer | ............... | G11C 7/1006 365/189.05 |
| 2013/0070412 A1* | 3/2013 | Ge | .......................... | G06F 1/185 361/679.32 |
| 2013/0155637 A1* | 6/2013 | Yin | ......................... | G06F 1/185 361/791 |
| 2014/0281224 A1* | 9/2014 | Frink | ...................... | G06F 1/181 711/114 |

(Continued)

OTHER PUBLICATIONS

U.S. Appl. No. 14/217,121, filed Mar. 17, 2014, David Edward Bryan.

(Continued)

*Primary Examiner* — Idriss N Alrobaye
*Assistant Examiner* — Brooke J Taylor
(74) *Attorney, Agent, or Firm* — Robert C. Kowert; Kowert, Hood, Munyon, Rankin & Goetzel, P.C.

(57) ABSTRACT

A system includes a rack with multiple hardware acceleration devices and at least one modular controller coupled together into one or more particular processing systems. Each modular hardware acceleration device includes multiple hardware accelerators, such as graphical processing units (GPUs), field programmable gate arrays (FPGAs), or other specialized processing circuits. In each modular hardware acceleration device, the multiple hardware accelerators are communicatively coupled to a multi-port connection device, such as a switch, that is also communicatively coupled to at least two external ports of the modular hardware acceleration device. A modular controller of a particular processing system coordinates operation of hardware accelerators of multiple hardware acceleration devices included in the particular processing system to provide advanced processing capabilities. Modular hardware acceleration devices may be added to or taken away from particular processing systems to adjust advanced processing capabilities of the particular processing systems.

18 Claims, 10 Drawing Sheets

(56) References Cited

U.S. PATENT DOCUMENTS

| | | | |
|---|---|---|---|
| 2015/0052275 A1* | 2/2015 | Maroney | G06F 13/4068 710/301 |
| 2015/0067223 A1* | 3/2015 | Xiao | G06F 13/4081 710/302 |
| 2016/0012006 A1* | 1/2016 | Motamedi | H05K 7/10 710/301 |
| 2016/0062936 A1* | 3/2016 | Brassac | G06F 13/4027 710/314 |
| 2016/0147697 A1* | 5/2016 | Arroyo | G06F 9/44505 710/104 |
| 2016/0234962 A1* | 8/2016 | Shinsato | G11B 33/128 |

OTHER PUBLICATIONS

U.S. Appl. No. 14/489,453, filed Sep. 17, 2014, Mark Bradley Davis.
U.S. Appl. No. 14/938,654, filed Nov. 11, 2015, Nicholas Patrick Wilt.
U.S. Appl. No. 14/938,457, filed Nov. 11, 2015, Nicholas Patrick Wilt.

* cited by examiner

MODULAR HARDWARE ACCELERATION DEVICE

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Some such servers include a number of hardware acceleration processors that are peripheral to a central processor. These peripheral hardware acceleration processors may include processor hardware configured to perform specialized tasks (for example, a server may include graphics processing units with hardware acceleration processors designed to perform tasks related to graphics processing; other servers may include field programmable gate arrays, or other types of hardware accelerators). Typically, servers include such peripheral hardware acceleration processors in a common chassis of the server along with other server components such as a central processing unit (CPU), memory devices, etc.

Some uses of such servers may require different hardware acceleration capabilities. For example, some graphics processing applications or machine learning applications may require complicated calculations to be performed, thus requiring more hardware acceleration capabilities than other applications. In order to perform these calculations, multiple hardware acceleration processors, such as graphics processing units, may operate together with a central processor to perform these calculations. However, servers that include peripheral processors, such as hardware acceleration processors, in a common chassis of the server along with other server components, may not be configured to operate with other servers to increase hardware acceleration capabilities of the servers. Also, using multiple servers may lead to wasted space in a rack due to redundant server components that are included in the multiple servers.

Figure 1:
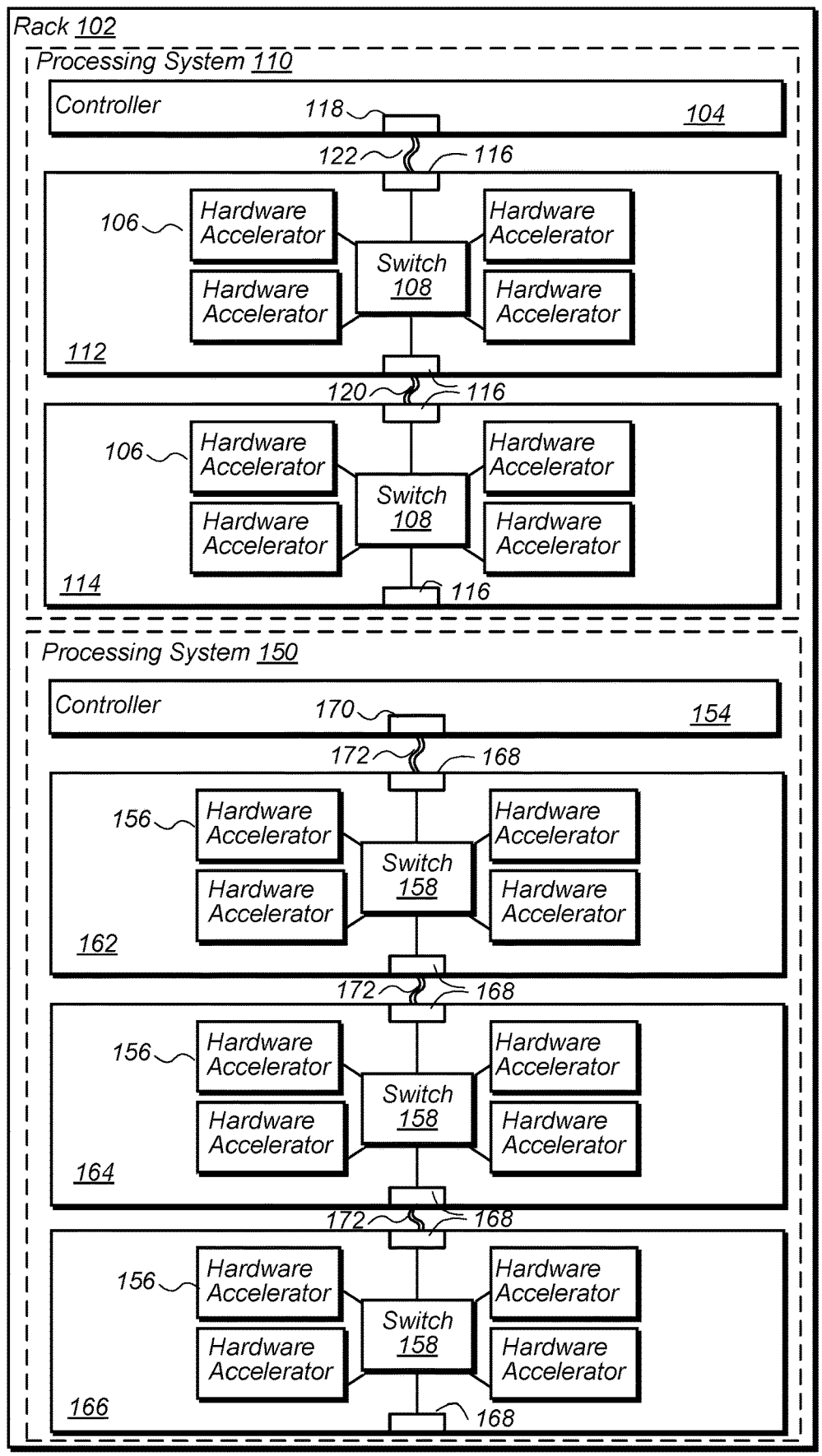
FIG. 1 is a schematic diagram illustrating groups of hardware acceleration devices coupled with respective modular controllers in a rack, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of computer systems, and systems and methods for performing computing operations, are disclosed. According to one embodiment, a system includes a rack and multiple modular hardware acceleration devices mounted in the rack. The system also includes one or more modular controllers mounted in the rack. Each of the modular hardware acceleration devices includes a chassis configured to mount in the rack, a set of hardware accelerators coupled with the chassis, and multiple ports coupled with the chassis. The sets of hardware accelerators of each modular hardware acceleration device include respective hardware accelerators communicatively coupled to a multi-port connection device, such as an interconnect switch, that interconnects the hardware accelerators with one another via the interconnect switch. The multiple ports of each hardware acceleration device are also communicatively coupled to the respective multi-port connection devices of the respective hardware acceleration devices. In the system, a group of the hardware acceleration devices are coupled with one another and at least one modular controller via the ports of the modular hardware acceleration devices to form a particular processing system with multiple sets of hardware accelerators and at least one modular controller, wherein the modular controller of the particular processing group is configured to coordinate operation of the multiple sets of hardware accelerators of the multiple hardware acceleration devices that are coupled together in the particular processing system. For example, each modular hardware acceleration device may include four hardware accelerators, such as four graphic processing units (GPUs). A particular processing system may include multiple hardware acceleration devices coupled together and controlled by a common modular controller. For example, three modular hardware acceleration devices, each comprising four GPUs, may be coupled together along with a modular controller to form a particular processing system with 12 GPUs whose operation are coordinated by the common modular controller. The modular controller may include a central processing unit (CPU) server that controls the hardware accelerators coupled in the particular processing system as peripheral components of the CPU used to accelerate processing. As discussed in more detail below, other combinations of hardware accelerators and hardware acceleration devices may be included in a particular processing system.

According to one embodiment, a modular hardware acceleration device includes a chassis configured to mount in one or more slots of a rack and a set of hardware accelerators coupled with the chassis, wherein respective ones of the plurality of hardware accelerators are communicatively coupled to multi-port connection device that connects the hardware accelerators with one another. The modular hardware acceleration device also includes multiple ports coupled to the chassis. The multiple ports are also communicatively coupled to the multi-port connection device. Also, the modular hardware acceleration device is configured to couple with one or more additional modular hardware acceleration devices and one or one or more modular controllers, via the multiple ports, to form a processing system comprising multiple sets of hardware accelerators, wherein the set of hardware accelerators of the modular hardware acceleration device are configured to be controlled by the one or more modular controllers.

According to one embodiment, a method includes coupling two or more modular hardware acceleration devices with one another via respective ports of the modular hardware acceleration devices, wherein each modular hardware acceleration device comprises a set of hardware accelerators, wherein respective ones of the plurality of hardware accelerators are communicatively coupled to multi-port connection device that interconnects the hardware accelerators of the modular hardware acceleration device with one another, wherein the multi-port connection device is communicatively coupled to a plurality of ports of the modular hardware acceleration device. The method also includes coupling at least one of the two or more modular hardware acceleration devices to a modular controller, wherein the modular controller is configured to coordinate operation of the respective sets of hardware accelerators of the two or more modular hardware acceleration devices. For example, to form a particular processing system multiple hardware acceleration devices may be coupled together along with a modular controller, where the modular controller coordinates operation of multiple hardware accelerators of each of the modular hardware acceleration devices.

As used herein, a "cable" includes any cable, conduit, or line that carries one or more conductors and that is flexible over at least a portion of its length. A cable may include a connector portion, such as a plug, at one or more of its ends.

As used herein, "circuit board" means any board or plate that has one or more electrical conductors transmitting power, data, or signals from components on or coupled to the circuit board to other components on the board or to external components. In certain embodiments, a circuit board is an epoxy glass board with one or more conductive layers therein. A circuit board may, however, be made of any suitable combination of materials.

As used herein, "chassis" means a structure or element that supports another element or to which other elements can be mounted. A chassis may have any shape or construction, including a frame, a sheet, a plate, a box, a channel, or a combination thereof. In one embodiment, a chassis is made from one or more sheet metal parts. A chassis for a hardware acceleration device may support circuit board assemblies, power supply units, fans, cables, and other components of the hardware acceleration device.

As used herein, "computing" includes any operations that can be performed by a computer, such as computation, data storage, data retrieval, or communications.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

As used herein, to "direct" air includes directing or channeling air, such as to a region or point in space. In various embodiments, air movement for directing air may be induced by creating a high pressure region, a low pressure region, or a combination of both. For example, air may be directed downwardly within a chassis by creating a low pressure region at the bottom of the chassis. In some embodiments, air is directed using vanes, panels, plates, baffles, pipes or other structural elements.

As used herein, "mounting" a particular element on another element refers to positioning the particular element to be in physical contact with the other element, such that the other element provides one or more of structural support, positioning, structural load transfer, stabilization, shock absorption, some combination thereof, or the like with regard to the particular element. The mounted particular element may be positioned to rest upon one or more upper surfaces of the other element, independent of coupling the elements via one or more coupling elements, such as fasteners. In some embodiments, mounting the particular element to another element includes coupling the elements such that the other element provides one or more of structural support, positioning, structural load transfer, stabilization, shock absorption, some combination thereof, or the like with regard to the particular element.

As used herein, a "rack" means a rack, container, frame, or other element or combination of elements that can contain or physically support one or more computer systems. In some embodiments, a rack is a standard 19" rack that conforms to an EIA rack standard.

Some service providers provide computing resources to clients of the service provider by allocating computing resources maintained by the service provider to the client for periods of time or according to various other service arrangements. The allocated computing resources may include physical computing devices that are reserved for exclusive use by the client or may include virtual resources that are implemented on shared physical computing devices that are maintained by the service provider. For example a service provider may operate a service provider network that includes one or more data centers with computing resources available to be allocated to clients of the service provider.

Some clients of a provider network may request computing resources with specialized or advanced processing capabilities. For example, some clients may desire computing resources with specialized processors configured to perform advanced processing operations, such as graphics calculations, cryptographic calculations, or configured to perform other advanced processing operations. In order to satisfy customer demand, some data centers may include servers with specialized processors, such as graphical processing units (GPUs), cryptographic acceleration circuits, field programmable gate arrays (FPGAs), etc. However client demand for specialized processing capabilities may change over time. Also specialized processor capability requirements may vary from customer to customer. Some servers that include specialized processors, such as GPUs, cryptographic acceleration circuits, FPGAs, etc., may include a fixed number of specialized processors. However, in some instances a client may desire more specialized processing capacity than is included in a server with a fixed number of specialized processors, or in some instances a client may desire less specialized processing capacity than is included in a server with a fixed number of specialized processors. For example, some servers may include 8 GPUs, 16 GPUs, etc. However, a client may desire specialized processing capability equivalent to 12 GPUs. In such circumstances, a service provider may not be able to fulfill the customer's request if the service provider's servers only include 8 GPUs. Or, the service provider may over allocate resources to the client. For example if the service provider's servers include 16 GPUs, the service provider may allocate a 16 GPU server to the client that requested a server with 12 GPU capabilities, thus resulting in an inefficient use of the service provider's resources. In another example, a service provider may allocate two 8 GPU servers to the client in order to provide the requested processing capacity of 12 GPUS. However, in some data centers the two 8 GPU servers may not be configured to coordinate operations with each other, thus reducing the efficiency of using the two 8 GPU servers. In addition, the two 8 GPU servers may include other server components in a common chassis, such as central processing units, memory, etc., where the other server components are redundant between the two 8 GPU servers and not necessary to perform the particular application being performed by the client. This also may result in an inefficient allocation of resources of the provider network.

In another example, client demand for specialized processing capability of resources of the provider network made available to clients may change over time. For example, as computing demands change, clients who previously demanded servers with specialized processing capacity equivalent to 8 GPUs may start requesting servers with specialized processing capacity equivalent to 12 GPUs, 16 GPUs, etc. A server provider with a fleet of 8 GPU servers may have to replace the 8 GPU servers with servers with more specialized processing capacity to meet client demands, or may group 8 GPU servers together to meet client demand. However, such an arrangement may lead to redundant server components and an inefficient allocation of resources, as described above.

In some embodiments, a service provider may provide servers with specialized processing capabilities to clients of the service provider using modular hardware acceleration devices and a separate modular controller. A modular hardware acceleration device may include a set of specialized processors, referred to herein as "hardware accelerators." The hardware accelerators included in a modular hardware acceleration device may include GPUs, cryptographic acceleration circuits, field programmable gate arrays (FPGAs), application specific integrated circuits (ASICs), or other specialized processors. A modular hardware acceleration device may also include two or more external ports and a multi-port connection device, such as an interconnect switch that interconnects the hardware accelerators and the external ports of the modular hardware acceleration device. For ease of illustration, a multi-port connection device is referred to herein as a "switch." However, in some embodiments, a multi-port connection device may include a switch integrated with other components such that the multi-port connection device includes functionality in addition to switching functionality. For example, in some embodiments switching functionality may be integrated with a hardware accelerator, such as an ASIC chip with multiple ports.

In some embodiments, the external ports may be mini SAS HD ports, and the interconnect switch may be a peripheral component interconnect express (PCIe) switch. Multiple modular hardware acceleration devices may be coupled together, via their respective ports, with a separate controller to form a particular processing system. The particular processing system may function as a server with specialized processors, but may also be adjustable so that additional modular hardware acceleration devices may be added to the particular processing system to increase the specialized processing capability of the particular processing system. Also, modular hardware acceleration devices may be decoupled from a particular processing system and coupled to another particular processing system to re-balance specialized processing capacity.

FIG. 1 is a schematic diagram illustrating groups of hardware acceleration devices coupled with respective controllers in a rack, according to some embodiments. In some embodiments, a system includes a rack with multiple modular hardware acceleration devices and modular controllers mounted in the rack. For example, FIG. 1 schematically illustrates rack 102 that includes hardware acceleration devices 112, 114, 162, 164, and 166 mounted in rack 102. Modular controllers 104 and 154 are also mounted in rack 102. Each of hardware acceleration devices 112, and 114 includes hardware accelerators 106 and each of hardware acceleration devices 162, 164, and 166 includes hardware accelerators 156. In some embodiments, hardware accelerators 106 and 156 may be graphics processing units (GPUs), cryptographic processing circuits, field programmable gate arrays (FPGAs), application specific integrated circuits (ASICs) or another type of specialized processor. In some embodiments hardware accelerators 106 and 156 may be general purpose processors. In some embodiments, hardware accelerators 106 and hardware accelerators 156 may be different types of hardware accelerators. For example, hardware accelerators 106 may comprise GPUs, whereas hardware accelerators 156 may comprise FPGAs.

In FIG. 1, hardware acceleration device 112 is communicatively coupled with hardware acceleration device 114 via cable 120 that is coupled with respective external ports 116 of hardware acceleration devices 112 and 114. In addition, hardware acceleration device 112 is communicatively coupled with modular controller 104 via cable 122 coupled with external port 116 of hardware acceleration device 112 and port 118 of modular controller 104. Hardware acceleration devices 112 and 114 coupled with modular controller 104 may form a particular processing system in rack 102, such as particular processing system 110.

Also in FIG. 1, hardware acceleration devices 162, 164, and 166 are communicatively coupled with one another via external ports 168 and cables 172. Modular controller 154 is also communicatively coupled with hardware acceleration device 162 via port 170 and one of cables 172. Modular hardware acceleration devices 162, 164, and 166 coupled with modular controller 154 may form a separate particular processing system in rack 102 that is separate from particular processing system 110. For example, modular hardware acceleration devices 162, 164, and 166 coupled with modular controller 154 may form processing system 150.

In some embodiments, a particular processing system comprising multiple hardware acceleration devices and at least one modular controller may function as a single server controlled by the modular controller. For example, a modular controller, such as modular controller 104, may include various server components, such as a central processor, network interface card, memory, etc. and hardware accelerators 106 of hardware acceleration devices 112 and 114 may be communicatively coupled via port 118 with a bus of modular controller 104, such that hardware accelerators 106 of hardware acceleration devices 112 and 114 appear to other components of modular controller 104 to be peripheral processors coupled on a common bus of modular controller 104. In a similar manner, hardware accelerators 156 of hardware acceleration devices 162, 164, and 166 may appear to other components of modular controller 154 to be peripheral processors coupled on a common bus of modular controller 154.

Each of hardware acceleration devices 112, and 114 also includes an interconnect switch 108 and external ports 116. Each of hardware acceleration devices 162, 164, and 166 include an interconnect switch 158 and external ports 168. In some embodiments, hardware accelerators and respective interconnect switches of each modular hardware acceleration device may be configured to operate in accordance with a peripheral interconnect express (PCIe standard). PCI Express (also referred to as PCIe) is a high-speed serial computer expansion bus standard. In general, a PCIe bus supports full-duplex communication between any two endpoints, with data encapsulated in packets. For example a hardware accelerator of hardware acceleration device 112 may be configured to send and receive encapsulated data packets with a hardware accelerator of hardware acceleration device 114 in accordance with the PCIe standard and using respective interconnect switches 108 as PCIe interconnect switches. A CPU of a modular controller may coordinate operations of multiple hardware accelerators in multiple hardware acceleration devices coupled together in a particular processing system that includes the modular controller. In some embodiments, a particular processing system may include more than one modular controller coupled with multiple hardware acceleration devices. In some embodiments, a hardware accelerator of hardware acceleration device 112 may be configured to send and receive encapsulated data packets with a hardware accelerator of hardware acceleration device 114 in accordance with another communication standard such as, Rapid TO, or other suitable standards.

In some embodiments, particular processing systems in a single rack may include more or less modular hardware acceleration devices than other particular processing systems in the rack. For example, particular processing system 110 includes two modular hardware acceleration devices and 8 total hardware accelerators 106, whereas particular processing system 150 includes three modular hardware acceleration devices and 12 total hardware accelerators 156. In some embodiments, additional hardware acceleration devices such as any of hardware acceleration devices 112, 114, 162, 164, or 166 may be decoupled from a particular processing system and coupled with a different particular processing system to rebalance hardware acceleration capacity between the particular processing systems. In addition, in some embodiments additional hardware acceleration devices may be added to particular processing system 110 or particular processing system 150 to increase hardware acceleration capabilities of particular processing system 110 or particular processing system 150.

In some embodiments, a particular processing system, such as particular processing system 110 or particular processing system 150 may include more than one modular controller. For example, particular processing system 110 may include two modular controllers 104 coupled with hardware acceleration devices 112 and 114.

In FIG. 1, hardware acceleration devices 112, 114, 162, 164, and 166 are illustrated as each comprising four hardware accelerators, two external ports, and a single interconnect switch. However, in some embodiments, a modular hardware acceleration device may include more or less hardware accelerators, more or less external ports, or may include multiple interconnect switches.

For ease of illustration in FIG. 1, hardware accelerators and switches of the respective hardware acceleration devices have been illustrated vertically above one another. However, hardware accelerators and switches of the respective hardware acceleration devices may be mounted on a circuit board so that the hardware accelerators and switches are in a common horizontal plane when mounted in a rack. For example, hardware accelerators and switches of a hardware acceleration device may be mounted on a circuit board in a chassis configured to mount in a 1U slot in a server rack, such as rack 102.

Figure 2:
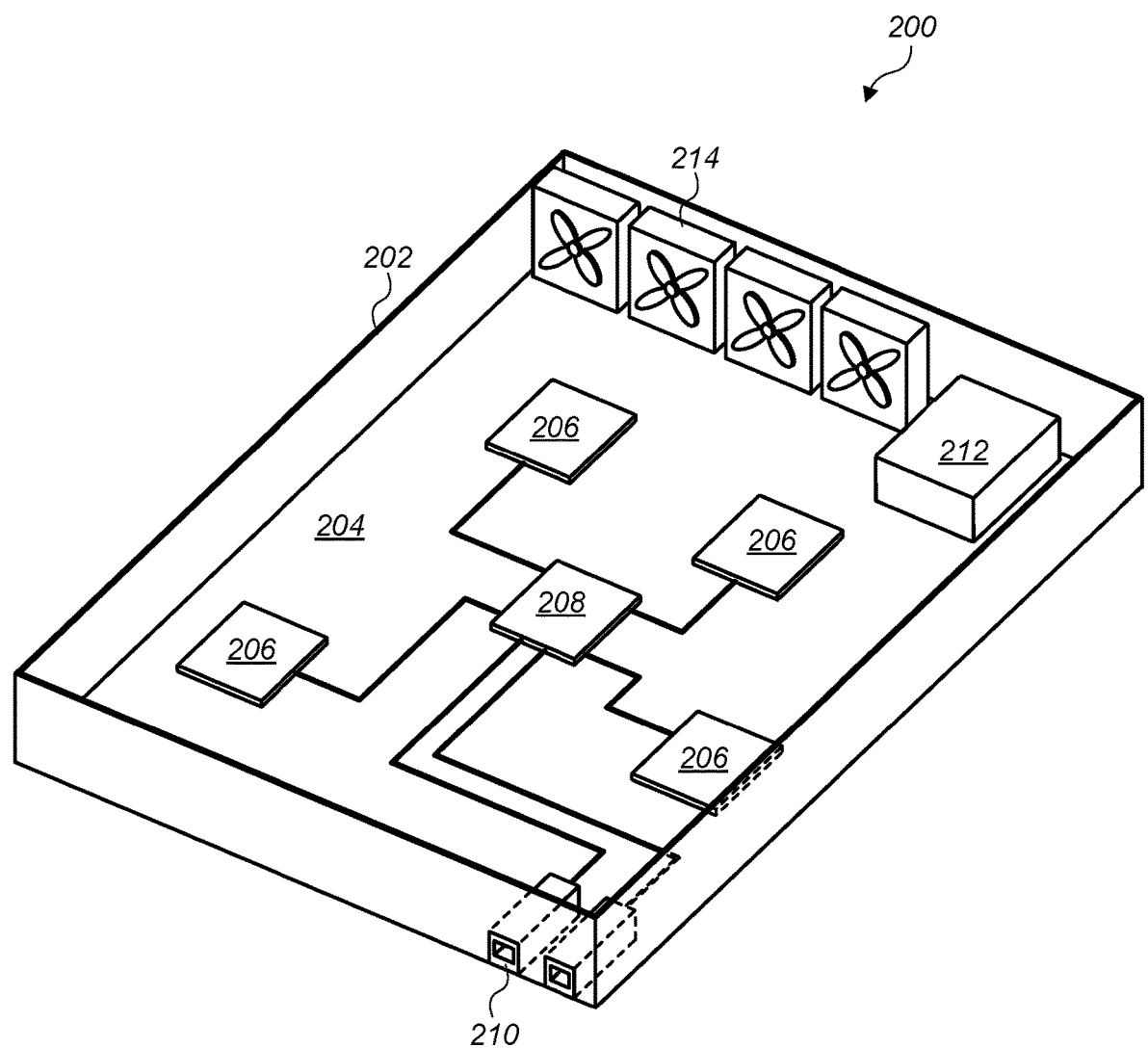
FIG. 2 illustrates a perspective view of a hardware acceleration device, according to some embodiments.

FIG. 2 illustrates a perspective view of a hardware acceleration device, according to some embodiments. Hardware acceleration device 200 includes chassis 202 with circuit board 204 mounted within chassis 202. Four hardware accelerators 206 are mounted on circuit board 204 and communicatively coupled to interconnect switch 208. External ports 210 are also mounted on circuit board 204 and communicatively coupled to interconnect switch 208. In FIG. 2, interconnect switch 208, hardware accelerators 206 and external ports 210 are coupled together via circuit tracing. In some embodiments, interconnect switch 208, hardware accelerators 206 and external ports 210 may be coupled together using a different medium, such as a cable or other connector. Hardware acceleration device 200 also includes fans 214 and power supply 212. In some embodiments, power supply 212 may supply power to hardware accelerators 206 and interconnect switch 208, via circuit board 204. In some embodiments power supply 212 may be coupled to hardware accelerators 206 and interconnect switch 208 via one or more cables.

In some embodiments, a hardware acceleration device may be air cooled. For example, fans 214 may direct air flow through hardware acceleration device 200 to cool hardware accelerators 206 and interconnect switch 208. In some embodiments, a hardware acceleration device, may be liquid cooled. Also, in some embodiments, a hardware acceleration device may include more or less hardware accelerators, and may include more or less ports. Any of the hardware acceleration devices 112, 114, 162, 164, or 164 may be a hardware acceleration device 200 as described in FIG. 2.

Figure 3:
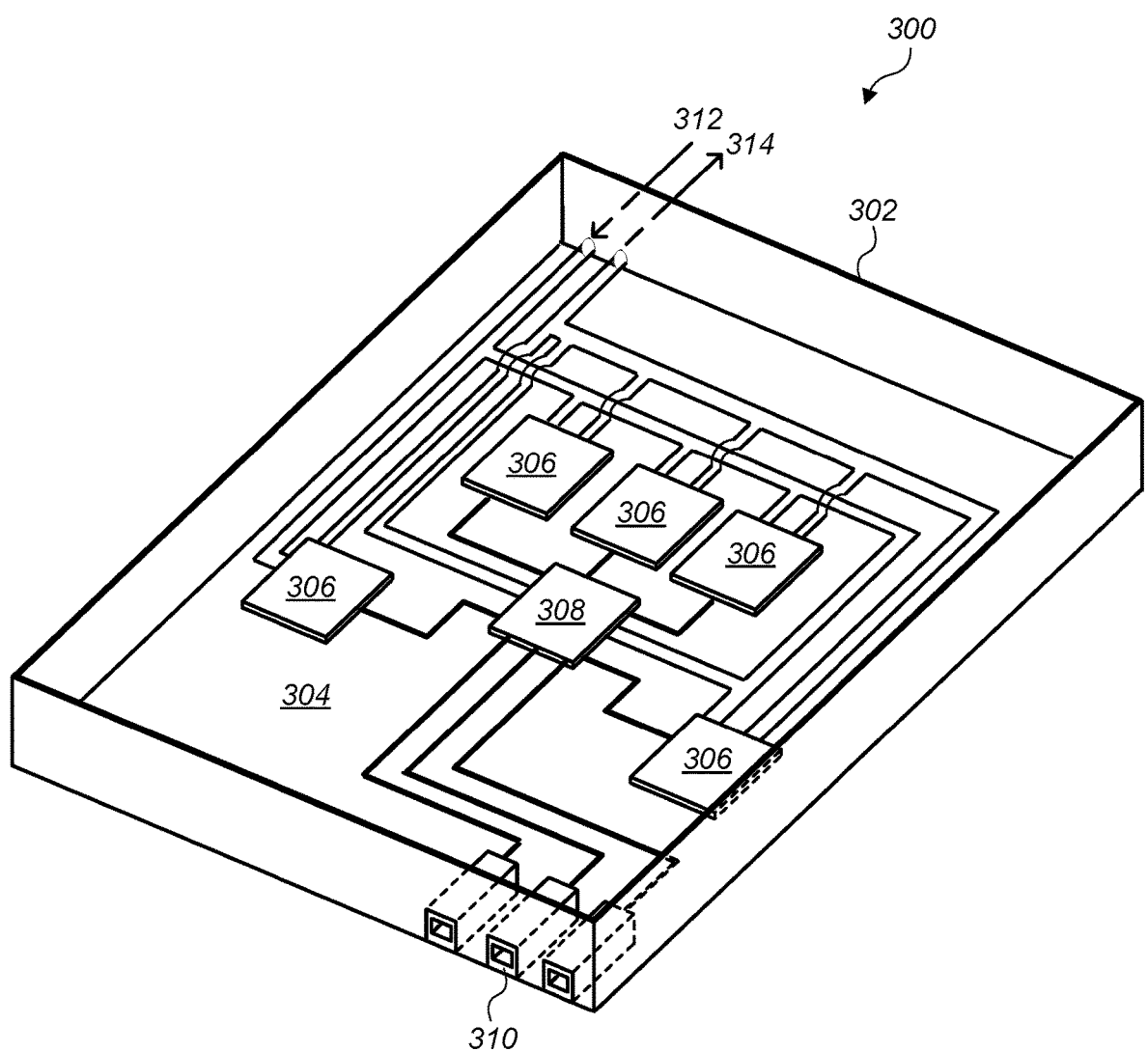
FIG. 3 illustrates a perspective view of a hardware acceleration device, according to some embodiments.

FIG. 3 illustrates another perspective view of a hardware acceleration device, according to some embodiments. Hardware acceleration device 300 includes chassis 302 and circuit board 304 mounted within chassis 302. Five hardware accelerators 306 are mounted on circuit board 304. Interconnect switch 308 and external ports 310 are also mounted on circuit board 304. Hardware accelerators 306, interconnect switch 308, and external ports 310 are communicatively coupled with each other via circuit tracings of circuit board 304. In some embodiments, hardware accelerators 306, interconnect switch 308, and external ports 310 may be communicatively coupled via other means, such as via respective cables. Hardware acceleration device 300 is liquid cooled. Cool liquid flows into hardware acceleration device 300 via cooling inlet 312. The liquid flows over or through respective ones of hardware accelerators 306 and interconnect switch 308. After removing heat from the respective ones of hardware accelerators 306 and interconnect switch 308, the liquid flows out of hardware acceleration device 300 via cooling outlet 314. In some embodiments cooling inlet 312 and cooling outlet 314 may couple with a cooling supply and return system in a rack or a data center in which hardware acceleration device 300 is mounted. Any of the hardware acceleration devices 112, 114, 162, 164, or 164 described in FIG. 1 may be a hardware acceleration device 300 as described in FIG. 3.

Figure 4A:
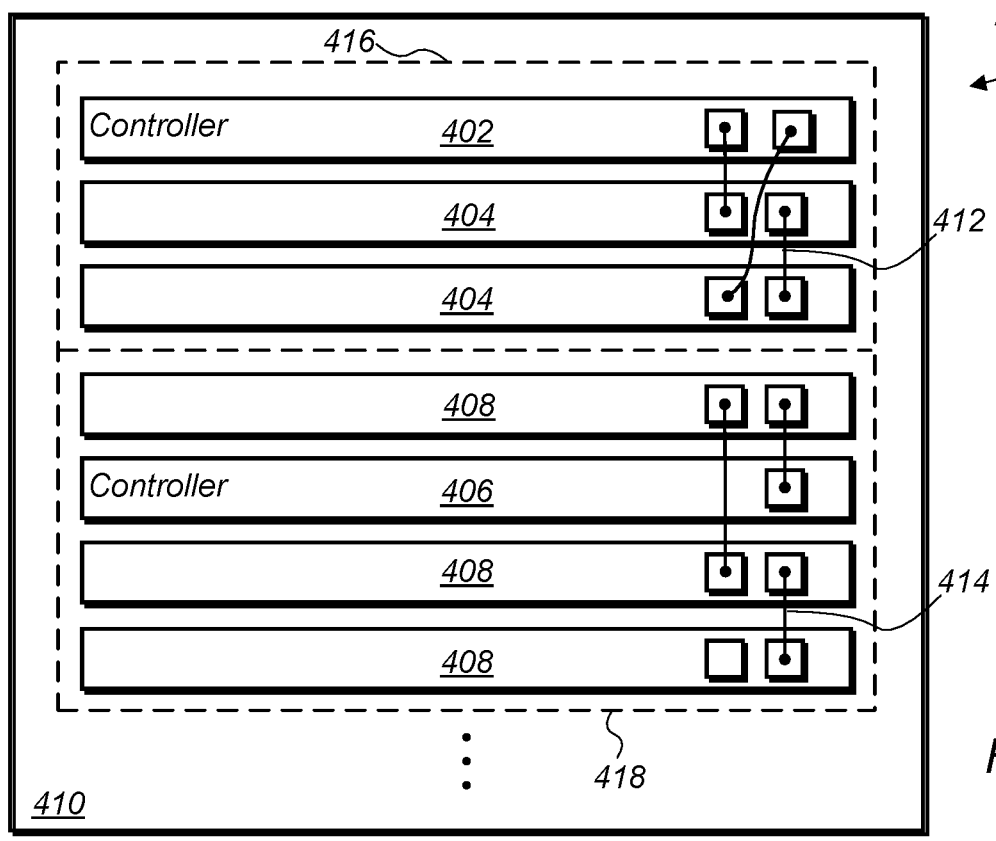
FIG. 4A illustrates a front view of hardware acceleration devices mounted in a rack, according to some embodiments.
Figure 4B:
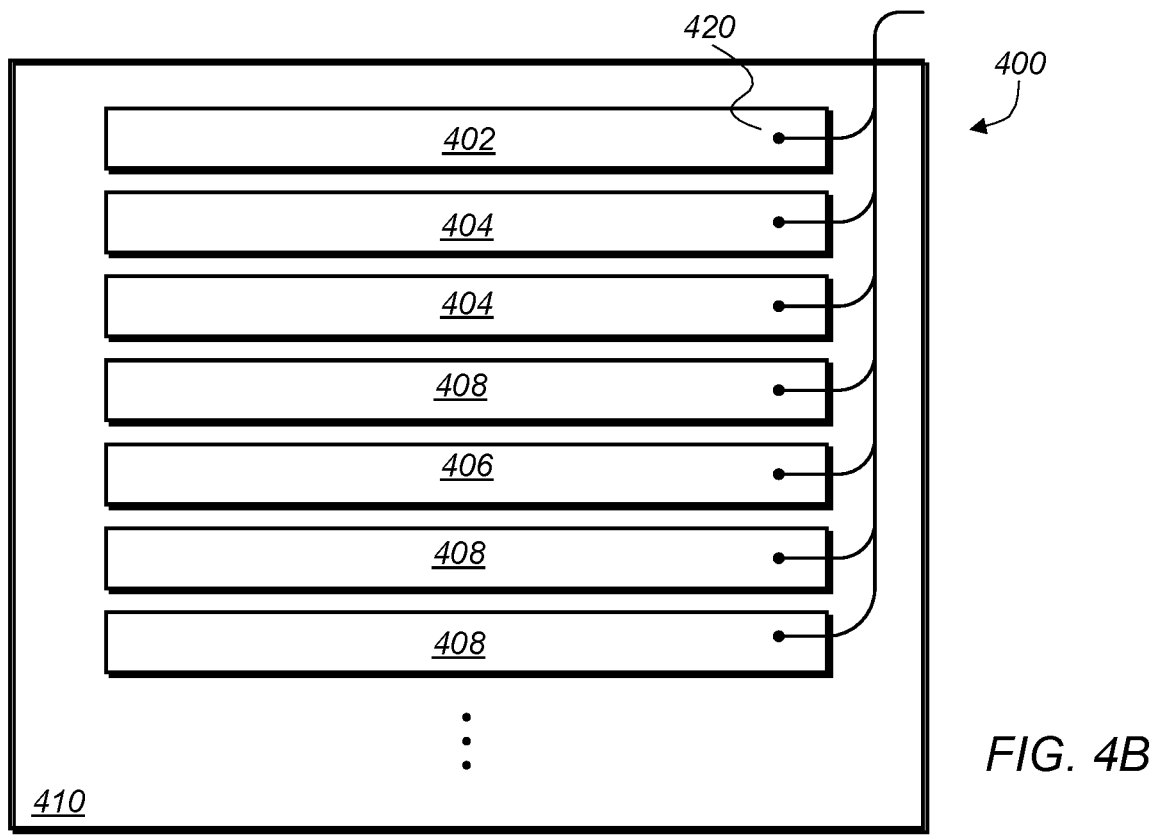
FIG. 4B illustrates, a back view of hardware acceleration devices mounted in a rack, according to some embodiments.

In some embodiments, modular hardware acceleration devices and modular controllers may be mounted in slots of a server rack and coupled together via connectors, such as cables connected to respective external ports of the modular hardware acceleration devices and modular controllers. FIGS. 4A-B illustrate a front view and a back view of hardware acceleration devices mounted in a rack, according to some embodiments. System 400 includes modular hardware acceleration devices 404 and 408 mounted in rack 410 along with modular controllers 402 and 406. Cables 412 couple together modular hardware acceleration devices 404 and modular controller 402 to form particular processing system 416. Cables 414 couple together modular hardware accelerators 408 and modular controller 406 to form particular processing system 418. Ellipses are shown in FIG. 4A to indicate that rack 410 may include more or less hardware acceleration devices and more or less modular controllers grouped together to form more or less particular processing systems.

In some embodiments, a service provider operating a data center that includes a rack, such as rack 410, including multiple modular hardware acceleration devices and modular controllers, such as modular hardware acceleration devices 404 and 408 and modular controllers 402 and 406, may forecast demand for resources of the provider network with advanced processing capabilities that include various types of hardware accelerators included in the hardware acceleration devices, such as GPUs, cryptographic acceleration circuits, FPGAs, ASICs, etc. After determining an anticipated demand forecast, the server provider may couple together modular hardware acceleration devices and modular controllers to provide for the anticipated demand. For example, a service provider may determine that demand for processing systems with the capacity of 12 GPUs is higher than previously. In response, the service provider may couple together modular hardware acceleration devices that include GPUs, such that there are sufficient number of particular processing systems in the service provider's data center with the 12 GPU capacity. Subsequently demand for 12 GPU processing systems may go down and demand for 16 GPU processing systems may increase. In order to meet the changing demand, the service provider may couple additional hardware acceleration devices to particular processing systems that had 12 GPU capacity to increase the GPU capacity of the particular processing systems to 16 GPU capacity. The service provider may also uncouple some particular processing systems with 12 GPU capacity and couple separate modular hardware acceleration devices form the decoupled particular processing systems with other particular processing systems to increase the GPU capacity of the other particular processing systems. This may balance the service provider's supply of specialized computing resources to match anticipated client demand. For example, in response to changing client demand, a service provider operating a data center including rack 410 may uncouple one of modular hardware acceleration devices 404 from particular processing system 416 and couple the un-coupled modular hardware acceleration device 404 with one of the module hardware acceleration devices 408 of particular processing system 418 to increase the GPU capacity of particular processing system 418. Any of the modular hardware acceleration devices described in FIGS. 1-4 may be coupled and de-coupled to particular processing systems to balance specialized processing capacity. Examples are given describing modular hardware acceleration devices with four GPU hardware accelerators. However, in some embodiments hardware acceleration devices may include other types of hardware accelerators and other quantities of hardware accelerators.

FIG. 4B illustrates a back view of rack 102, modular controllers 402 and 406, and modular hardware acceleration devices 404 and 408. In some embodiments, management systems of modular hardware acceleration devices and modular controllers may be commonly controlled by a local or remote system. For example, modular hardware acceleration devices 404 and 408 and modular controllers 402 and 406 may include a management and control circuit configured to communicate with an external health monitoring and management system. For example, management and control ports 420 may enable modular hardware acceleration devices 404 and 408 and modular controllers 402 and 406 to send and receive management and health monitoring signals, such as device temperatures, and instructions to power on and power off respective modular hardware acceleration devices and modular controllers. In some embodiments, modular hardware acceleration devices 404 and 408 and modular controllers 402 and 406 may communicate management and health monitoring information according to intelligent management platform interface (IP-MIP) standards via management and control ports 420.

In some embodiments, a modular hardware acceleration device may have a height that occupies a 1U slot in a standard 19" rack. For example each of modular hardware acceleration devices 404 and 408 may be mounted in 1U slots in rack 410. Modular hardware acceleration devices 404 and 408 may be any of the modular hardware acceleration devices described in FIGS. 1-3.

In some embodiments, hardware accelerators of modular hardware acceleration devices may be coupled together in various topologies, such as a ring topology, a fan-out topology, a tree topology, or various other suitable topologies. For example, modular hardware acceleration devices 404 and modular controller 402 of particular processing system 416 are coupled together in a ring-topology. Note that cables 412 connect modular controller 402 to a first one of modular hardware acceleration devices 404 and a last one of modular hardware acceleration devices, so that collectively modular controller 402 is configured in a ring with modular hardware acceleration devices 404.

In embodiments, in which a modular controller and modular hardware acceleration devices are connected in a tree-topology, cables connecting modular hardware acceleration devices may form a trunk of the tree topology and the hardware accelerators of each hardware acceleration device coupled to an interconnect switch of the hardware acceleration devices may form branches off of the trunk in the tree topology.

Figure 5:
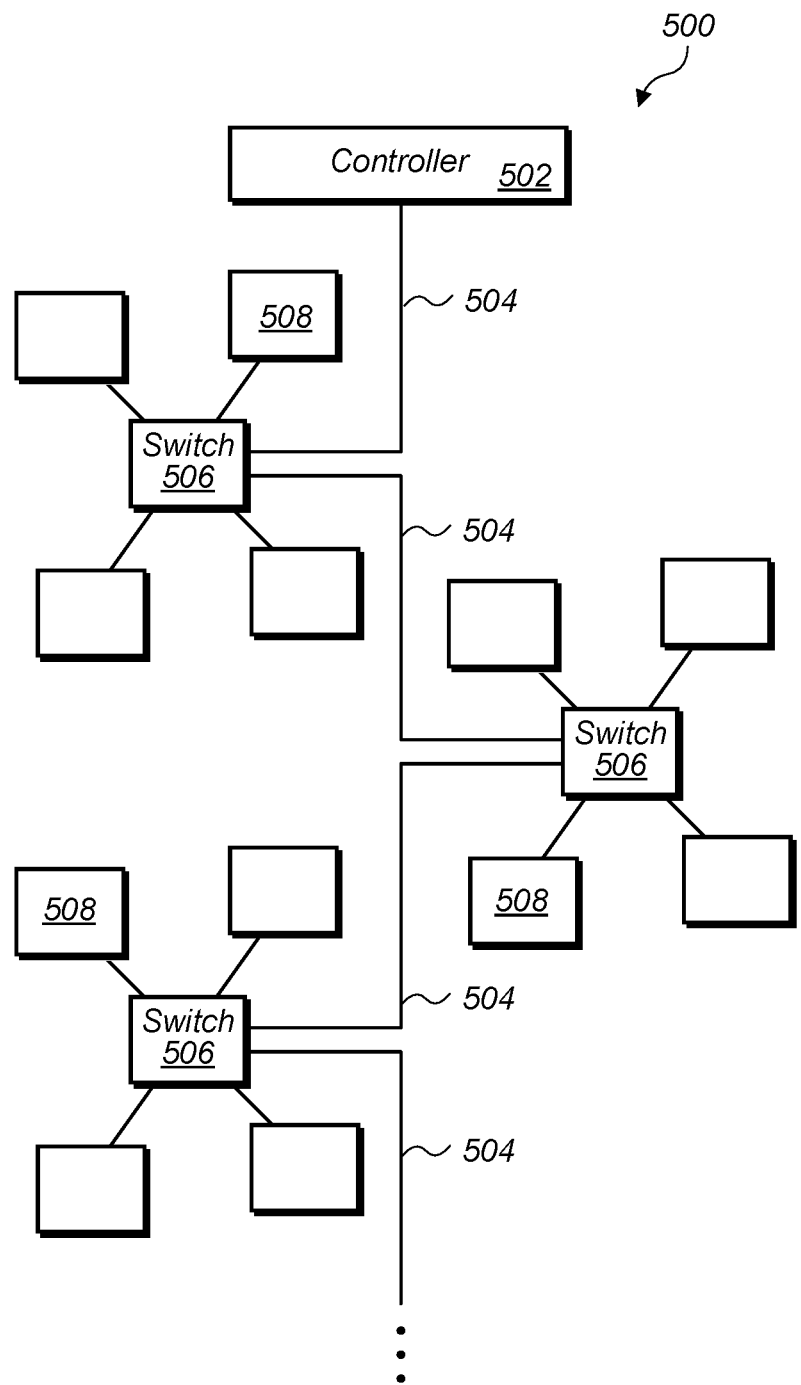
FIG. 5 illustrates hardware accelerators of coupled hardware acceleration devices that form a tree topology of hardware accelerators, according to some embodiments.

For example, FIG. 5 illustrates hardware accelerators of coupled hardware acceleration devices that form a tree topology of hardware accelerators, according to some embodiments. System 500 includes modular controller 502, in some embodiments, modular controller 502 may be a central processing unit or CPU server. Coupled to modular controller 502 via cables 504, that form a trunk for system 500, are interconnect switches 506. Hardware accelerators 508 are coupled to respective interconnect switches 506 and form branches off of the trunk formed by cables 504. In some embodiments, a modular hardware acceleration device may include more than two external ports. In such embodiments, modular hardware acceleration devices may be coupled together in a tree topology with multiple layers of branches.

Figure 6:
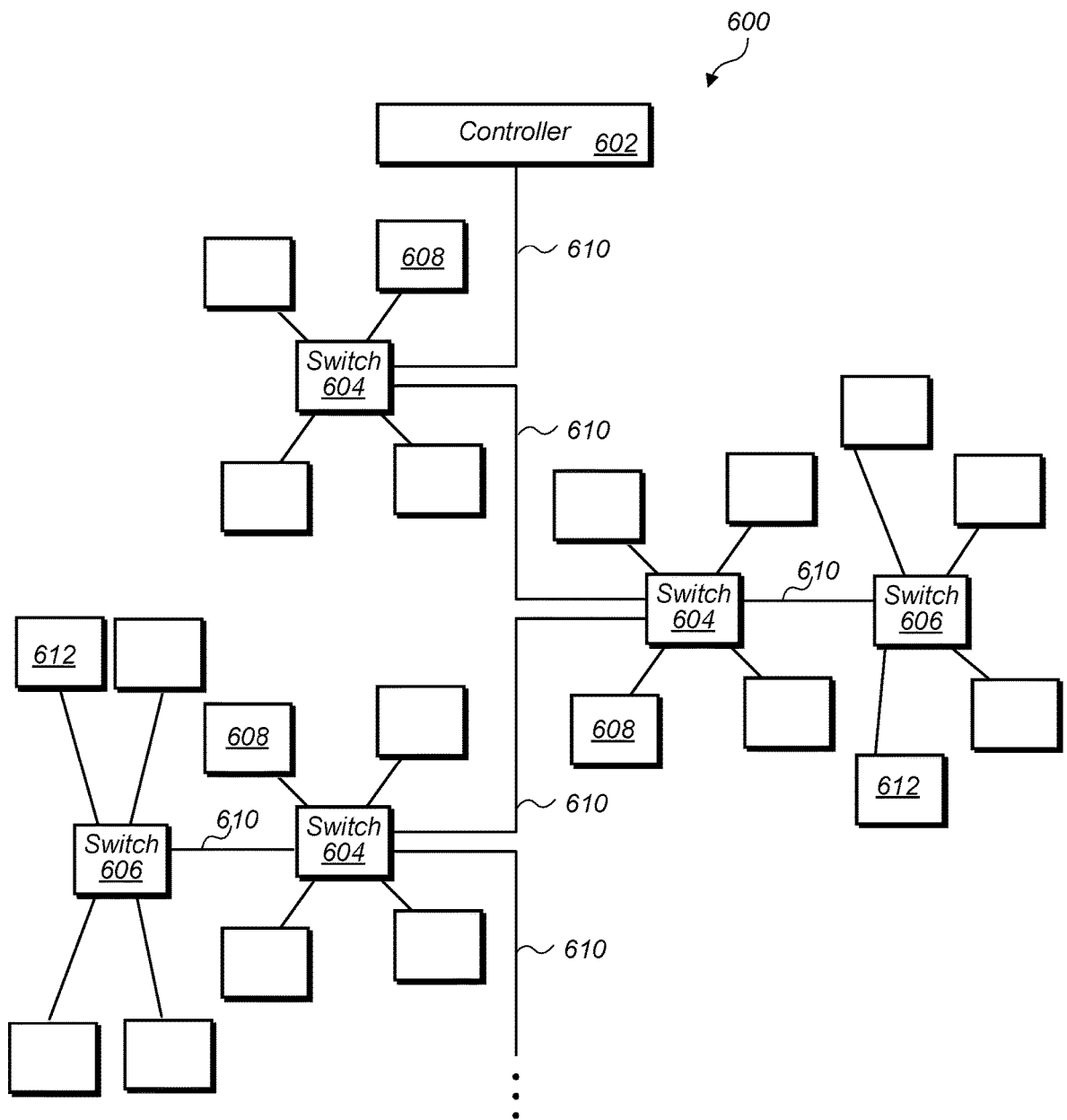
FIG. 6 illustrates hardware accelerators of coupled hardware acceleration devices that form a multi-layer tree topology of hardware accelerators, according to some embodiments.

For example, FIG. 6 illustrates hardware accelerators of coupled hardware acceleration devices that form a tree topology of hardware accelerators with multi-layered branches, according to some embodiments. System 600 includes modular controller 602 and cables 610 that form a trunk of a tree topology of system 600. Interconnect switches 604 are coupled to cables 610 and hardware accelerators 608 in a first layer branch of system 600. In addition, interconnect switches 606 are communicatively coupled to interconnect switches 604 in a second layer branch of a tree topology of system 600. Hardware accelerators 612 are communicatively coupled to interconnect switches 606 in the second branch layer of the tree topology of system 600. In some embodiments, various other topologies with various other layers and numbers of hardware acceleration devices may be formed by coupling together hardware acceleration devices via external ports of the hardware accelerations devices.

In some embodiments, hardware accelerators of hardware acceleration device are directly connected peer-to-peer with hardware accelerators of commonly coupled hardware acceleration devices. For example, any of the hardware accelerators shown in FIGS. 1, 4, 5, and 6 may be directly connected peer-to-peer with any other one of the hardware accelerators shown in FIGS. 1, 4, 5, and 6.

Figure 7:
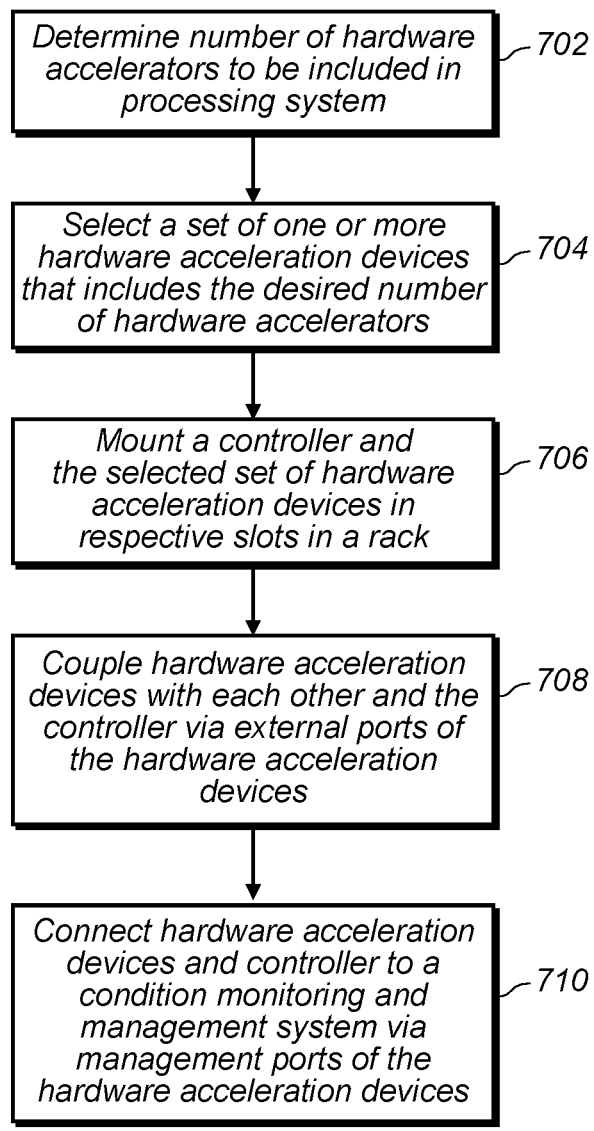
FIG. 7 illustrates a process of providing hardware acceleration capacity, according to some embodiments.

FIG. 7 illustrates a process of providing hardware acceleration capacity, according to some embodiments. At 702 a number of hardware accelerators to be included in a processing system is determined. For example it could be determined that a particular processing system is to have 12 GPUs included in the particular processing system. In some embodiments, a number of hardware accelerators to be included in a particular processing system may be determined based on demand forecasting for a service provider network. For example, a demand forecast may indicate that additional resources with processing capabilities equivalent to 16 GPU may need to be added to resources of the server provider network to meet anticipated client demand. Accordingly, it may be determined that a particular processing system is to include 16 GPUs.

At 704, a set of one or more hardware acceleration devices that include the desired number of hardware accelerators is selected. For example, if it is determined that a particular processing system is to include 16 GPUs, four hardware acceleration devices that each include 4 GPUs may be selected to be included in the particular processing system.

At 706, the selected hardware acceleration devices are mounted in respective slots in a rack. Also, a modular controller may also be mounted in the rack along with the selected modular hardware acceleration devices. In some embodiments, modular hardware acceleration devices and modular controllers may already be installed and a rack and may be reconfigured as described below at 708 and 710. In such embodiments where the modular hardware acceleration devices and modular controllers are already installed in the rack, 706 may be omitted.

At 708, the selected set of hardware acceleration devices are coupled together via cables and ports of the selected hardware acceleration devices. In addition one or more modular controllers is also coupled with the set of selected hardware acceleration devices to form a particular processing system with the determined number of hardware accelerators. In some embodiments, one or more hardware acceleration devices may already be coupled to a modular controller to for a particular processing system and one or more additional hardware acceleration devices may be added to the particular processing system by coupling the one or more additional hardware acceleration devices to one of the hardware acceleration devices already included in the particular processing system.

At 710, health monitoring and management ports of the hardware acceleration devices are coupled to a health management and monitoring system. For example, the selected modular hardware acceleration devices may include intelligent management platform interface (IPMI) ports or equivalent ports to connect the modular hardware acceleration devices to an external system that provides management and monitoring capabilities. In some embodiments, modular hardware acceleration devices may be internally managed, e.g. they may have their own internally managed cooling systems and not include an IPMI port. In some embodiments, step 710 may be omitted.

Figure 8:
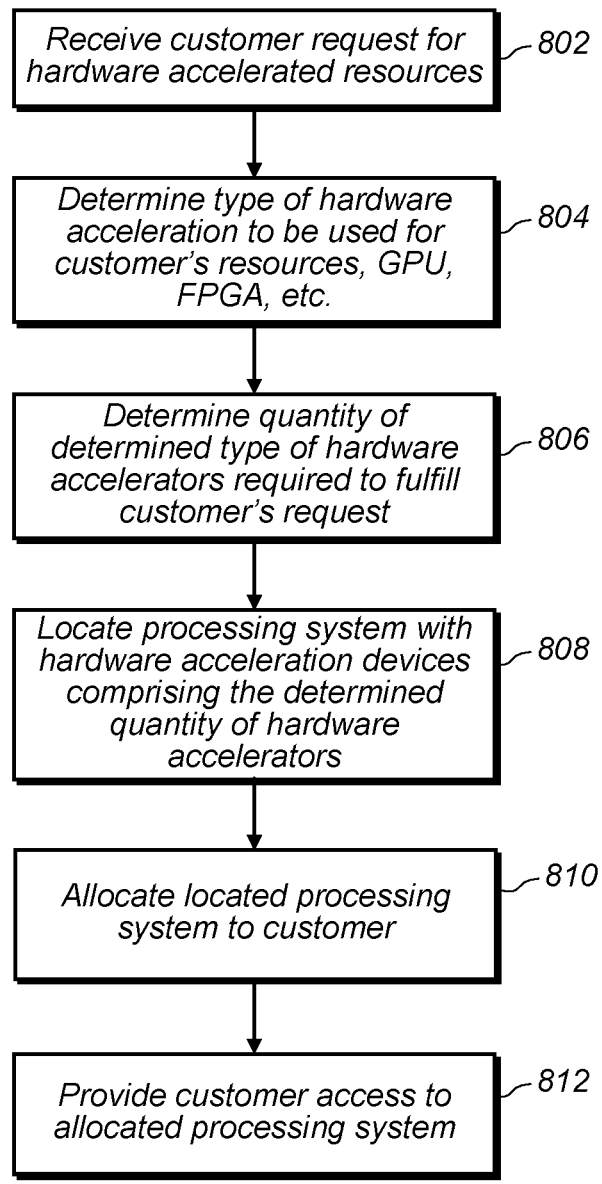
FIG. 8 illustrates a process of allocating hardware acceleration capacity, according to some embodiments.

FIG. 8 illustrates a process of allocating hardware acceleration capacity, according to some embodiments. At 802, a customer request for hardware accelerated resources is received. For example, a customer request may indicate the customer requests a processing system with processing capacity equivalent to 8 GPUs.

At 804, it is determined the type of hardware acceleration requested by the customer. For example it may be determined that the customer request hardware accelerated resources with GPUs, FPGAs, cryptographic acceleration circuits, ASICs, or some other type of hardware accelerators.

At 806, the quantity of the determined type of hardware accelerators needed to fulfill the customer's request is determined. In some embodiments, a customer may specify a number of hardware accelerators to be included in a processing system to be allocated to the customer. In some embodiments, a customer may specify a performance metric, such as a capability to process a certain type of data in a certain amount of time, and the service provider may determine the type and quantity of hardware accelerators that are needed to fulfill the customer's request. In some embodiments the quantity of hardware accelerators needed to fulfill the customer's request may be determined in other manners.

At 808, a particular processing system with hardware acceleration devices comprising the determined type and quantity of hardware accelerators is located. In some embodiments, a service provider may operate a data center that includes several modular hardware acceleration devices configured in several different processing systems with different types and quantities of hardware accelerators. The service provider may maintain a directory of the different processing systems, the types of hardware accelerators included in the different processing systems, and the quantity of hardware accelerators included in the different processing systems. In some embodiments, a service provider may maintain a directory that is organized based on other characteristics of processing systems that include modular hardware acceleration devices, such as overall processing capabilities. In order to locate a particular processing system with the desired type and quantity of hardware accelerators, the service provider may search the service provider's directory to locate particular processing systems that are available to fulfil the customer's request.

At 810, after a particular processing system is located that fulfills the customer's request, the processing system may be allocated to the customer. For example, the processing system may be marked in the service provider's directory as being allocated to the customer.

At 812, the customer may be provided access to the allocated processing system. For example, the processing system may be made available to the customer as a virtual machine implemented on physical hardware having the processing capabilities requested by the customer. In some embodiments, the processing system may be provided for exclusive use by the customer without being shared with other customers of the service provider.

Figure 9:
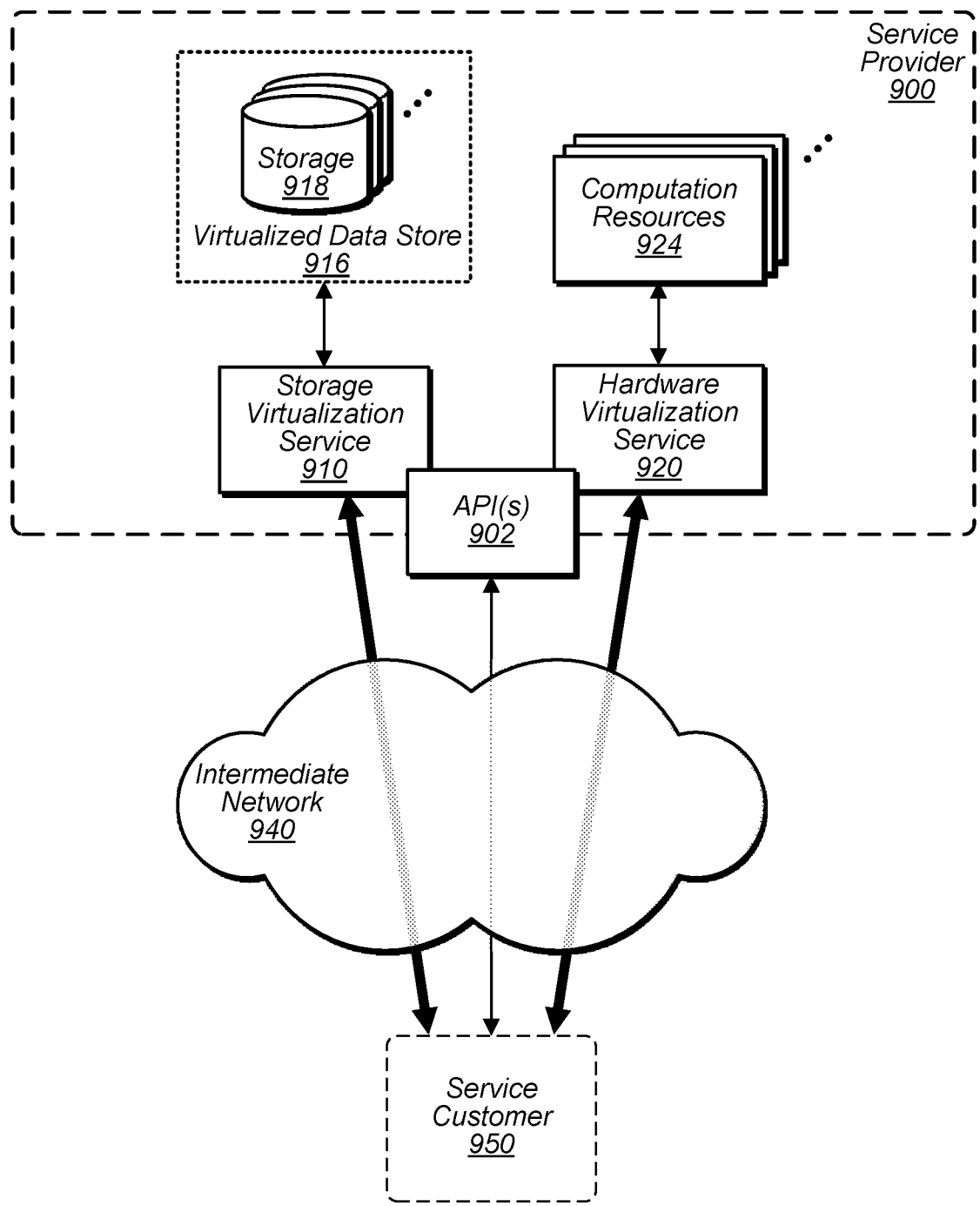
FIG. 9 illustrates a block diagram of a service provider network that implements storage and computation resources available to customers of the service provider, according to some embodiments.

FIG. 9 is a block diagram of an example service provider network that provides a storage virtualization service and a hardware virtualization service to customers, according to some embodiments. Any of the particular processing systems described above that include modular hardware acceleration devices may be provided to a customer of a service provider network as a hardware virtualization service. Hardware virtualization service 920 provides multiple computation resources 924 (e.g., VMs, which may be implemented on particular processing systems that include modular hardware acceleration devices) to customers. The computation resources 924 may, for example, be rented or leased to customers of the service provider 900 (e.g., to service customer 950).

Service provider 900 may provide a service customer 950 the ability to implement virtual computing systems via hardware virtualization service 920 coupled to intermediate network 940. In some embodiments, hardware virtualization service 920 may provide one or more APIs 902, for example a web services interface, via which a service customer 950 may access functionality provided by the hardware virtualization service 920. In at least some embodiments, virtualized storage resources at customer 950 may correspond to a storage resource 918 of virtualized data store 916 that is leased, rented, or otherwise provided to customer 950 via storage virtualization service 910. In some embodiments, computation resources 924 may be provided to customer for exclusive use by the customer without using hardware virtualization service 920.

Illustrative System

Figure 10:
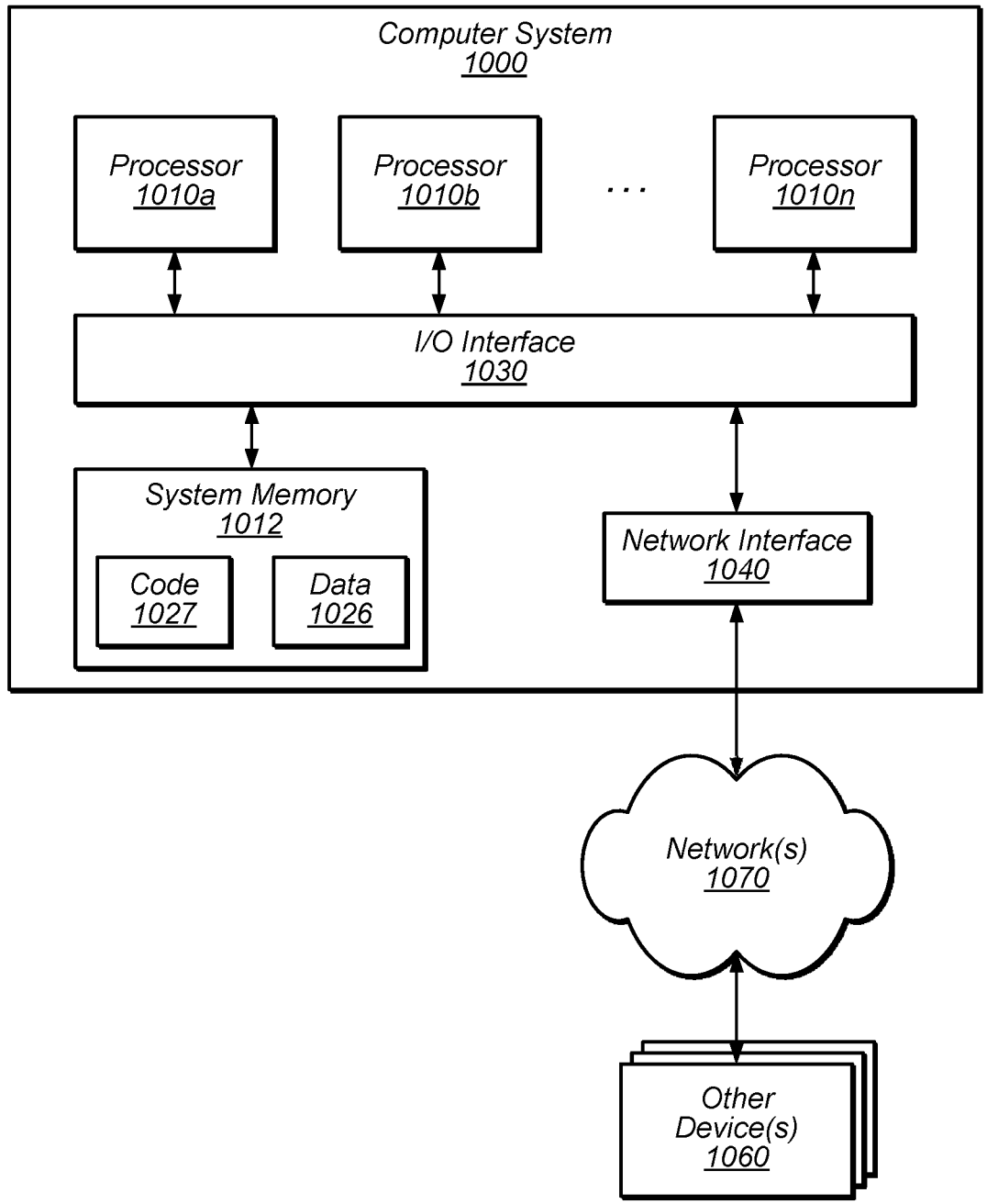
FIG. 10 illustrates a computer system that can be used in a service provider network and/or to at least partly implement a modular controller, according to some embodiments.

In some embodiments, a computer that implements a portion or all of one or more of the technologies, including but not limited to the modular controller and the methods and apparatus for controlling modular hardware acceleration devices as described herein, may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider methods and apparatus and the methods and apparatus for transferring data over a network, are shown stored within system memory 1020 as code 1025 and data 1026.

In one embodiment, I/O interface 1030 may be configured to coordinate I/O traffic between processor 1010, system memory 1020, and any peripheral devices in the device such as modular hardware acceleration devices coupled with a modular controller, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect Express (PCIe) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a non-transitory computer-accessible medium configured to store program instructions and data for implementing a particular processing system that includes multiple modular hardware acceleration devices as described above relative to FIGS. 1-9. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

For clarity, devices in many of the figures herein have been shown with a simple box outline around functional components. In various embodiments, a device or a chassis for a device may include an enclosure, a tray, a mounting plate, a combination thereof, as well as various other structural elements.

Although in the embodiments described above, some of the modular hardware acceleration devices have been described as being 1U in height, modular hardware acceleration devices may in various embodiments be 2U, 3U, 4U, 5U, 6U or any other height or dimensions.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a rack;
a modular controller mounted in the rack;
modular hardware acceleration devices mounted in the rack, wherein each modular hardware acceleration device comprises:
a chassis configured to mount in the rack;
an interconnect switch mounted in the chassis;
a set of hardware accelerators mounted in the chassis;
a set of internal connectors that connect the hardware accelerators to the interconnect switch, wherein respective ones of the hardware accelerators of the set of hardware accelerators are communicatively coupled to the interconnect switch via respective ones of the internal connectors;
external ports coupled to the chassis; and
a set of internal connectors that connect the interconnect switch to the external ports, wherein respective ones of the external ports are communicatively coupled to the interconnect switch via respective ones of the internal connectors; and
external connectors that couple the modular controller and the respective modular hardware acceleration devices in a group with one another via the external ports of the modular hardware acceleration devices and the modular controller, wherein at least one of the external connectors couples the modular controller to a first one of the modular hardware acceleration devices and at least another external connector couples the first modular hardware acceleration device to an additional modular hardware acceleration device, to form a particular processing system with multiple sets of hardware accelerators, wherein the modular controller is configured to coordinate operation of the multiple sets of hardware accelerators of the particular processing system.

2. The system of claim 1, wherein the set of hardware accelerators are graphics processing units (GPUs), cryptographic acceleration circuits, field programmable gate arrays (FPGAs), application specific integrated circuits (ASICs), systems on a chip (SoC), or general purpose processors.

3. The system of claim 1, further comprising an additional processing system in the rack, the additional processing system comprising another group of the modular hardware acceleration devices, wherein the modular hardware acceleration devices of the other group are coupled with one another and another modular controller mounted in the rack, wherein the additional processing system comprises more modular hardware acceleration devices coupled with one another than the particular processing system.

4. The system of claim 1, wherein the modular hardware acceleration devices are each mounted in a 1U slot in the rack.

5. A modular hardware acceleration device, comprising:
a chassis configured to mount in a rack;
a multi-port connection device mounted in the chassis;
a set of hardware accelerators mounted in the chassis;
a set of connectors within the chassis that connect the hardware accelerators to the multi-port connection device, wherein respective ones of the hardware accelerators of the set of hardware accelerators are communicatively coupled to the multi-port connection device via respective ones of the connectors in the chassis;
external ports coupled to the chassis; and
a set of connectors within the chassis that connect the multi-port connection device to the external ports, wherein the respective ones of the external ports are communicatively coupled to the multi-port connection device via respective ones of the connectors in the chassis, wherein the modular hardware acceleration device is configured to couple with an additional modular hardware acceleration device via one or more of the external ports coupled to the chassis and is configured to couple with a modular controller via one or more other ones of the external ports, to form a processing system comprising multiple sets of hardware accelerators, wherein the sets of hardware accelerators of the modular hardware acceleration device are configured to be controlled by the modular controller;

and wherein the modular hardware acceleration device is also configured to be coupled to two other modular hardware acceleration devices, via the external ports, to form a processing system comprising three sets of hardware accelerators of three hardware acceleration devices.

6. The modular hardware acceleration device of claim 5, wherein the set of hardware accelerators comprises graphic processing units (GPUs).

7. The modular hardware acceleration device of claim 5, wherein the set of hardware accelerators comprises field programmable gate arrays (FPGAs).

8. The modular hardware acceleration device of claim 5, wherein the hardware accelerators of the hardware acceleration device are configured to be connected peer-to-peer via the multi-port connection device with hardware accelerators of an additional hardware acceleration device.

9. The modular hardware acceleration device of claim 5, wherein the multi-port connection device is an interconnect switch configured to operate in accordance with a peripheral component interconnect express (PCIe) standard.

10. The modular hardware acceleration device of claim 5, wherein the modular hardware acceleration device is configured to mount in a 1U slot in the rack.

11. The modular hardware acceleration device of claim 5, wherein the modular hardware acceleration device does not comprise a controller for the set of hardware accelerators mounted in the chassis of the modular hardware acceleration device.

12. The modular hardware acceleration device of claim 5, wherein the modular hardware acceleration device is configured to be coupled to the additional modular hardware acceleration device in a tree topology.

13. The modular hardware acceleration device of claim 5, wherein the modular hardware acceleration device further comprises a health management circuit configured to communicate with an external health monitoring and management system.

14. A method, comprising:
  determining a number of hardware accelerators that are to be included in a particular processing system;
  coupling modular hardware acceleration devices with one another via respective ports of the modular hardware acceleration devices to form a portion of the particular processing system that comprises the determined number of hardware accelerators, wherein each modular hardware acceleration device comprises:
    a set of hardware accelerators, wherein respective ones of the hardware accelerators of the set of hardware accelerators are communicatively coupled to a multi-port connection device that connects the hardware accelerators of the modular hardware acceleration device with one another, wherein the multi-port connection device is communicatively coupled to the one or more respective ports of the modular hardware acceleration device; and
  coupling one of the modular hardware acceleration devices to a modular controller via one or more other ones of the ports, wherein the modular controller is configured to coordinate operation of the respective sets of hardware accelerators of the modular hardware acceleration devices, wherein the modular hardware acceleration devices and the modular controller form the particular processing system; and
  coupling an additional modular hardware acceleration device with the two or more modular hardware acceleration devices to increase a ratio of hardware accelerators per modular controller in the particular processing system.

15. The method of claim 14, further comprising:
  uncoupling the additional modular hardware acceleration device from the modular hardware acceleration devices; and
  coupling the additional modular hardware acceleration device with a different set of modular hardware acceleration devices coupled with a different modular controller.

16. The method of claim 14, further comprising:
  coupling the modular hardware acceleration devices in respective 1U slots in a server rack; and
  coupling the modular controller in an additional 1U slot in the server rack.

17. The method of claim 14, wherein said coupling the modular hardware acceleration devices with one another via the respective ports of the modular hardware acceleration devices comprises coupling the modular hardware acceleration devices together in a ring topology.

18. The method of claim 14, wherein the set of hardware accelerators are graphics processing units (GPUs), cryptographic acceleration circuits, field programmable gate arrays (FPGAs), application specific integrated circuits (ASICs), systems on a chip (SoC), or general purpose processors.

* * * * *